No. 606,810. Patented July 5, 1898.
J. W. PACK.
RECOVERY OF GOLD FROM WASTE SOLUTIONS OF CHLORINATION WORKS.
(Application filed Oct. 27, 1897.)
(No Model.)
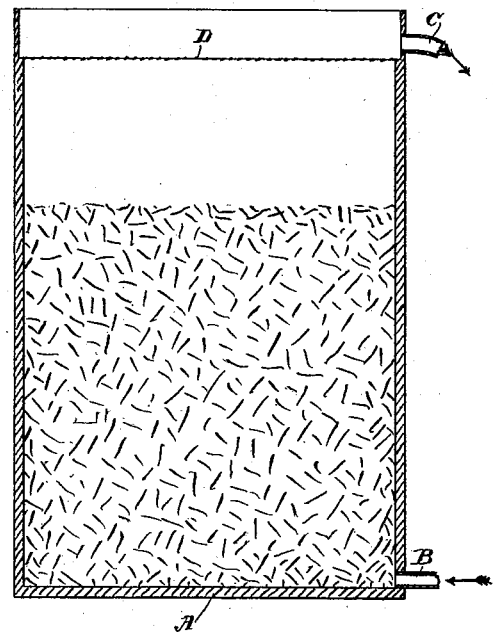
Witnesses,
Inventor,
John W. Pack
By Dewey & Co.
Attys

UNITED STATES PATENT OFFICE.

JOHN W. PACK, OF BERKELEY, CALIFORNIA.

RECOVERY OF GOLD FROM WASTE SOLUTIONS OF CHLORINATION-WORKS.

SPECIFICATION forming part of Letters Patent No. 606,810, dated July 5, 1898.

Application filed October 27, 1897. Serial No. 656,489. (No model.)

*To all whom it may concern:*

Be it known that I, JOHN W. PACK, a citizen of the United States, residing at Berkeley, county of Alameda, State of California, have invented an Improvement in the Recovery of Gold from Waste Solutions of Chlorination-Works; and I hereby declare the following to be a full, clear, and exact description of the same.

My invention relates to a means for recovering gold from waste solutions of chlorination-works.

It consists, essentially, in the employment of metallic aluminium, over which the chlorinated solution is passed, the chlorin uniting with the aluminium and freeing the gold which is thus precipitated.

In the treatment of chlorinated solutions of gold for the recovery of the gold there remains a small quantity of gold in the solution after the recovery of all that can be recovered by the best-known methods, and this small quantity it is the object of my invention to recover.

The accompanying drawing illustrates a form of apparatus which may be employed in the use of my invention.

In carrying out my invention I employ a wooden tub, tank, or container A, having an opening B at the bottom through which the chlorinated solution is introduced, and an outlet or overflow C at the top. The tank or container is supplied with aluminium in sheets or strips or other suitable or desirable form. Above the metallic filling and just below the outlet I fix a fine filter D, through which the liquid discharges. In order to prevent the fine precipitated gold from being carried upward through this filter by the current which is produced, I have found it necessary to coat it over from the lower side with some substance which will prevent the passage of anything but the liquid itself. I have found that a quantity of iron always occurs in these solutions. I therefore add to the solution at the beginning of the operation a small quantity of ammonia. This causes a precipitation of the iron salt upon the lower surface of the filter, which forms a sort of coating that will prevent the escape of any gold, but will allow the liquid to pass through and eventually escape.

The operation will then be as follows: The chlorinated solution being delivered into the receiving-passage at the bottom of the tank passes up through the aluminium, and the chlorin having a greater affinity for it than for the gold unites with the aluminium and the gold is precipitated.

Having thus described my invention, what I claim as new, and desire to secure by Letters Patent, is—

1. A device for recovering gold from waste solutions of chlorination-works, consisting of a containing vessel having metallic aluminium disposed therein, an inlet-passage at the lower portion and an outlet-passage at the upper portion of said vessel whereby the solution is caused to flow upwardly through the interposed metal, and a means above said metal and between the same and the outlet-passage, adapted to arrest and collect the fine precipitated gold from the solution which has passed through the metal and prevent its passing off with the liquid.

2. A means for recovering gold from waste solutions of chlorination-works, consisting of a tank having an inlet-passage at the lower portion and an outlet-passage at the upper portion and having metallic aluminium contained therein, and intermediate between the inlet and outlet passages of the tank, and a filter fixed within the tank between the metal and the outlet-passage and having its lower side coated with a substance which will arrest the fine precipitated gold and prevent it from passing off with the liquid.

3. A means for recovering gold from waste solutions of chlorination-works, consisting of a tank with inlet and outlet passages for the solution, metallic aluminium placed within the tank in the line of flow of the solution, and a filter placed between the metal and the outlet, said filter having a coating of an iron salt upon the surface against which the current impinges.

In witness whereof I have hereunto set my hand.

JOHN W. PACK.

Witnesses:
S. H. NOURSE,
JESSIE C. BRODIE.